Patented Nov. 18, 1952

2,618,538

UNITED STATES PATENT OFFICE 2,618,538

DIESEL FUEL COMPOSITION

Allen R. Jones, Roselle, N. J., and Anthony E. Robertson, Silver Spring, Md., assignors to Standard Oil Development Company, a corporation of Delaware No Drawing. Application February 3, 1949, Serial No. 74,484

4 Claims. (Cl. 44—57)

This invention relates to an improved diesel fuel composition containing an ignition promoter consisting of an organic peroxide and stabilizers for the organic peroxide which lengthen the effective lifetime of the organic peroxide. The organic peroxide stabilizers of this invention are nitro-aromatic amines or diamines and nitro or dinitro phenols.

A compression ignition engine or a diesel engine normally operates with a sufficiently high compression ratio, not only to raise the temperature of the fuel oil to its ignition temperature, but also to raise the fuel oil to this temperature in such a short time that there is an extremely short delay between the injection of the fuel oil and its ignition, usually less than 5 degrees crank rotation angle. If this delay is very large, then the fuel oil burns unevenly, which is disadvantageous since it results in rough engine operation and knocking with resultant high shock loads on engine parts.

Consequently, one of the important characteristics of a diesel fuel is its ignition quality. This property of the fuel is measured by means of a laboratory engine test and is expressed in units of cetane number. The cetane number of a fuel designates the per cent of cetane in a mixture of cetane and alpha methyl naphthalene which has the same ignition delay characteristics as that of the test fuel. There are several classes of components which are known to be effective in increasing the cetane number of diesel fuels. Among these are the organic peroxides and more specifically the organic hydroperoxides and hydroperoxide esters. The latter compounds may be said to be alkyl peresters of an aryl acid in which the alwyl group contains 3 to 6 carbon atoms and in which the aryl acid contains 7–11 carbon atoms, for example, tert. butyl perbenzoate. A specific example of the organic hydroperoxides is tert. butyl hydroperoxide. One of the disadvantages of this otherwise useful class of ignition promoters is their instability during storage since they tend to decompose so that after a period of storage, the original increment in ignition quality due to the peroxides may be lost. For example, in some cases it has been found that over a period of storage of six months or more, the decomposition of organic peroxides may be so extensive as to substantially eliminate 50% of their increase in the cetane number of the fuel. It is clearly of importance to determine a suitable means for stabilizing ignition promoters of this class. In accordance with this invention, therefore, it had been discovered that organic peroxides may be substantially stabilized by the addition to the diesel fuel containing the organic peroxide of small quantities of nitroaromatic amines or of nitro or dinitro phenols. By utilizing these compounds in a diesel fuel containing an organic peroxide, it is possible to substantially retard the decomposition of the organic peroxide so that the cetane number of the diesel fuel after a period of storage will more nearly approach the cetane number of the fuel prior to storage.

One class of compounds to be used in the practice of this invention are nitro anilines having from one to three nitro groups. It is preferred that these compounds should contain alkyl, cyclo- paraffinic or aryl groups either in the ring or attached to the amino group so as to render them more soluble in hydrocarbons. For example, members of the preferred class of stabilizers are:

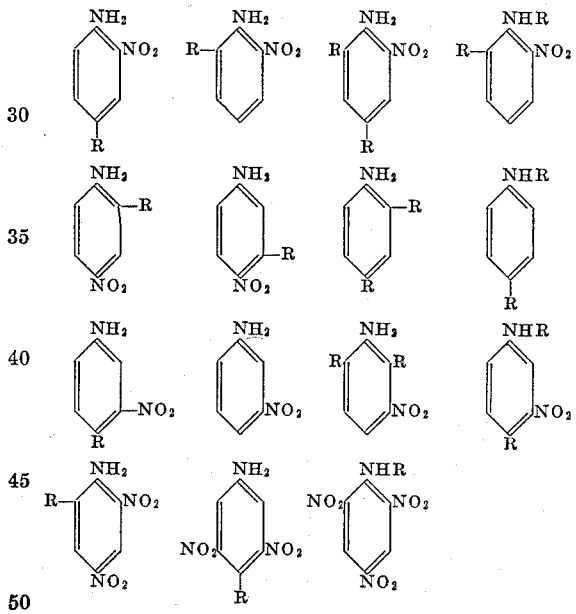

In these formulas and those shown below, "R" may represent a hydrogen atom but preferably a hydrocarbon group to impart better oil solubility to this class of compounds. For example, these hydrocarbon groups may be alkyl groups of 3 to 15 carbon atoms, substituted cyclopentyl or cyclohexyl groups of 6 to 15 carbon atoms, or substituted aryl groups of 6 to 15 carbon atoms.

As indicated, nitro or dinitro phenols may also be employed in the practice of this invention. Again, it is preferable that the nitro or dinitro phenols should contain alkyl, cyclo-paraffinic, or aryl groups as stated above so as to render the compounds more soluble in the diesel fuel. Specific examples of this class of compounds are:

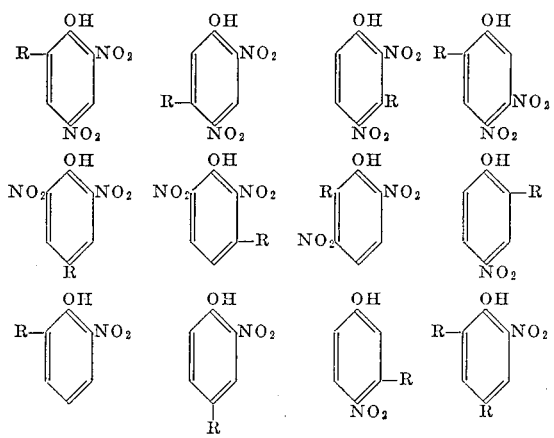

Thus the compounds indicated above may be defined to be mononuclear aromatic compounds having one OH group and one or two $NO_2$ groups and substituted alkyl, cyclopentyl, cyclohexyl, and aryl derivatives of these compounds.

In order to appreciate the benefits of this invention it is necessary that the peroxide stabilizing agents be added to the diesel fuel in concentrations of about 5 to 50 lbs. per 5,000 gallons of fuel. The amount of organic peroxides to be used in the fuel is the amount dictated by current practices in this regard;—in general about one half to two per cent by weight of the fuel. The diesel fuels to which the organic peroxides and peroxide stabilizers are added are hydrocarbon fuels falling within a boiling range of about 300 to 800° F. and may be composed of straight run, thermally cracked, or catalytically cracked components which may be treated or refined by conventional methods. The additives of this invention are of particular application to diesel fuels known as "high speed diesel fuels." These fuels generally have a boiling range of about 350° to 650° F. Other characteristics of fuels embodied in this invention are: an A. P. I. gravity of about 30° to 45°, a diesel index of about 35 to 80, a cetane number of about 30 to 60, a closed cup flash point of about 110° to 200° F., and a viscosity of about 350 Thermoviscosity up to a Saybolt Viscosity of 60 sec. at 100° F. It is apparent that this invention embraces fuel base stocks of the composition indicated plus any of the conventional additives employed with such fuels in addition to the novel additives of this invention.

As an example of this invention, a diesel fuel base stock was employed consisting of gas oil derived from thermal cracking operations having an initial boiling point of 370° F., a mid boiling point of 468° F., and a final boiling point of 594° F. The A. P. I. gravity of the fuel was 32.3°, the aniline point was 109.6° F., and the sulfur content was 0.47%. 1% by weight of the organic peroxide ester, tertiary butyl perbenzoate was added to this fuel base. This sample was stored for a period of nine months, from July to April, in five gallon samples exposed to prevailing outside temperature fluctuations as encountered in New Jersey. At intervals of several months, the samples were tested for cetane number by ASTM method D-613-43 and peroxide number by a modification of the method of Yule and Wilson. At the same time, additional samples of this diesel fuel were stored to which had been added 42 lbs. of 2,4-dinitro-6-cyclohexylphenol per 5,000 gallons of fuel. Indicated in Table I are the results of these field storage tests.

TABLE I

*Field storage test on diesel fuels*

[5 Gallon samples stored for nine months. Base Fuel: Thermal Gas Oil.]

| Inspection | Cetane number | | | Peroxide number | | |
|---|---|---|---|---|---|---|
| Ignition promoter | None | 1% t-Butylperbenzoate | | None | 1% t-Butylperbenzoate | |
| Stabilizer [1] | None | None | 2,4-Dinitro-6-cyclohexylphenol | None | None | 2,4-Dinitro-6-cyclohexylphenol |
| Months storage: | | | | | | |
| 0 | 35 | 42 | 42 | 0.1 | 78 | 81 |
| 1 | 37 | 42 | 44 | .6 | 56 | 64 |
| 2 | 36 | 42 | 44 | 2.3 | 50 | 58 |
| 3 | 36 | 42 | 44 | .9 | 50 | 60 |
| 9 | 35 | 42 | 44 | 3.0 | 58 | 66 |

[1] 42 lbs./5000 gallons of fuel.

It will be noted from the table that during the nine months storage period, the decomposition of the organic peroxide ester in samples not containing the dinitro phenol, was not sufficient to change the cetane number of the fuel. However, the samples of diesel fuel containing the dinitro cyclohexylphenol and the organic peroxide ester actually showed a slight increase in cetane number after the first month of storage. This result is accounted for by the known effect that an organic peroxide may react with a diesel fuel during the early portion of storage to yield constituents which increase the cetane number of the fuel. In the case of the unstabilized diesel fuel composition, as indicated in the table, this expected increase in cetane number was apparently offset by the decomposition of the organic peroxide ester. However, when the dinitro cyclohexylphenol was employed, the peroxide ester was apparently sufficiently stabilized so that the initial increase in cetane number in the first month of storage was appreciated and was maintained over the full nine months of storage. These results are also checked by the peroxide number determinations given in the table covering the storage period. It will be noted that in the case of the unstabilized diesel fuel containing the organic peroxide ester that the peroxide number at the end of nine months had dropped to 58 while in the case of the stabilized composition the peroxide number at the end of nine months had only dropped to 66.

What is claimed is:

1. A diesel fuel oil composition containing 0.5 to 2% of an organic peroxide and 5 to 50 lbs. of 2,4-dinitro-6-cyclohexyl phenol per 5000 gallons of diesel fuel.

2. The composition defined by claim 1 wherein the organic peroxide is an alkyl perester of an aryl acid in which the alkyl group contains 3 to 6 carbon atoms and in which the aryl acid contains 7 to 11 carbon atoms, said peroxide having a concentration of about 5 to 50 pounds per 5000 gallons of composition.

3. A diesel fuel composition containing 0.5 to 2% of an organic peroxide chosen from the class consisting of organic hydroperoxides and organic hydroperoxide esters and 5 to 50 lbs. of 2,4-dinitro-6-cyclohexyl phenol per 6000 gallons of diesel fuel oil.

4. A diesel fuel oil composition containing 0.5 to 2% of tertiary butyl perbenzoate and 5 to 50 lbs. of 2,4-dinitro-6-cyclohexyl phenol per 5000 gallons of diesel fuel.

ALLEN R. JONES.
ANTHONY E. ROBERTSON.

No references cited.